3,406,197
TRANSITION METAL CARBONYL CATALYSTS FOR CONVERTING ORGANIC ISOCYANATES TO CARBODIIMIDES
Henri Ulrich, North Branford, Conn., assignor to The Upjohn Company, Kalamazoo, Mich., a corporation of Delaware
No Drawing. Filed June 8, 1966, Ser. No. 555,970
12 Claims. (Cl. 260—551)

ABSTRACT OF THE DISCLOSURE

The conversion of organic mono- and poly-isocyanates to the corresponding carbodiimides is accomplished using as catalyst the complex of a d-group transition element and a π-bonding ligand. At least one of the ligands is carbon monoxide or a hydrocarbyl isocyanate (e.g. methyl isocyanide, phenyl isocyanide). Iron pentacarbonyl, diiron ennacarbonyl, tungsten hexacarbonyl and molybdenum hexacarbonyl are typical of the catalysts. The carbodiimides are useful as stabilizers for polyesters and the like, as acylation catalysts and dehydrating agents.

---

This invention relates to a novel process for the preparation of carbodiimides and is more particularly concerned with a process for the conversion of organic mono- and polyisocyanates to the corersponding carbodiimides using as catalysts certain complexes of the d-group of transition elements.

The novel process of the invention comprises a process for the conversion of an organic isocyanate to the corresponding carbodiimide by heating said organic isocyanate at a temperature within the range of about 100° C. to about 250° C. in the presence of a catalytic amount of a metal complex derived from a d-group transition element and a π-bonding ligand at least one of the π-bonding ligands in said metal complex being selected from the group consisting of carbon monoxide and hydrocarbyl isocyanide wherein hydrocarbyl is from 1 to 12 carbon atoms, inclusive.

The term "d-group transition metal" is one well-recognized in the art as designating the group of transition elements which have partially filled "d" shells; see, Cotton et al. Advanced Inorganic Chemistry, pp. 494–5, Interscience Publishers, New York, 1962. Said d-group of transition metals is inclusive of scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold.

The term "π-bonding ligand" is also one well-recognized in the art and designates a group of neutral (i.e. having no overall charge) moleclues possessing (a) a lone pair of electrons capable of being donated to form a valency bond with a d-group transition element and (b) vacant orbitals in addition to the lone pairs which vacant orbitals accept electron density from the filled metal orbitals to form a type of π-bonding supplementing the σ-bonding arising from lone pair donation; see, Cotton et al. supra, pp. 602–604 and 611. Examples of π-bonding ligands are carbon monoxide, nitric oxide, hydrocarbyl isocyanides, trihydrocarbyl phosphines, trihydrocarbylarsines, trihydrocarbylstibines, dihydrocarbyl sulfides, conjugated cycloaliphatic dienes, trienes, and the like.

The term "hydrocarbyl from 1 to 12 carbon atoms, inclusive" means the monovalent radical obtained by removing one hydrogen atom from the parent hydrocarbon having the stated carbon atom content. Illustrative of such groups are alkyl such as methyl, ethyl, propyl, butyl, pentyl, hexyl, heptyl, octyl, nonyl, decyl, undecyl, dodecyl, and isomeric forms thereof; alkenyl such as vinyl, allyl, butneyl, pentenyl, hexenyl, octenyl, dodecenyl and the like, including isomeric forms thereof; aralkyl such as benzyl, phenethyl, phenylpropyl, naphthylmethyl, and the like; aryl such as phenyl, tolyl, xylyl, naphthyl, bisphenylyl, and the like; cycloalkyl such as cyclobutyl, cyclopentyl, cyclohexyl, cycloheptyl, cyclooctyl, and the like, and cycloalkenyl such as cyclopentyl, cyclohexenyl, cycloheptenyl, cyclooctenyl and the like, including isomeric forms thereof.

Examples of hydrocarbyl isocyanides are methyl isocyanide, ethyl isocyanide, isopropyl isocyanide octyl, isocanide, 2-decyl isocyanide, cyclopentyl isocyanide cyclohexyl isocyanide, benzyl isocyanide, phenethyl isocyanide, naphthylmethyl isocyanide, phenyl isocanide, tolyl isocyanide, xylyl isocyanide, naphthyl isocyanide, and the like. Examples of trihydrocarbylphosphines are triethylphosphine,
diethylmethylphosphine,
triisopropylphosphine,
hexyldimethylphosphine,
octyldiethylphosphine,
ethylmethylphenylphosphine,
triphenylphosphine,
tri-2-naphthylphosphine,
tricyclohexylphosphine,
tricycloheptylphosphine,
tribenzylphosphine,
diethylbenzylphosphine and the like. Examples of trihydrocarbylarsines are trimethylarsine,
isopropyldimethylarsine,
triphentylarsine,
trioctylarsine,
triphenylarsine,
tri(o-tolyl)arsine,
tricyclopentylarsine,
tricycloheptylarsine,
tribenzylarsine,
dimethylbenzylarsine, and the like. Examples of trihydrocarbylstibines are tripropylstibine,
triisobutylstibine,
triheptylstibine,
octyldimethylstibine,
decyldiethylstibine,
phenyldimethylstibine,
triphenlstibine,
tri-2-naphthylstibine,
tricyclohexylstibine,
tricycloheptylstibine,
tribenzylstibine, and the like. Examples of dihydrocarbyl sulfides are dimethyl sulfide,
diethyl sulfide,
methyl isopropyl sulfide,
butyl methylsulfide,
dioctyl sulfide,
dissobutyl sulfide,
diphenylsulfide,
phenyl p-tolyl sulfide,
phenyl 2-naphthyl sulfide,
dibenzyl sulfide,
di(phenethyl)sulfide, and the like. Examples of conjugated cyloaliphatic dienes are cyclopentadiene, 1,3-cyclohexadiene, 1,3-cycloheptadiene, 1,3-cycloctatriene, and the like. Examples of conjugated cycloaliphatic trienes are 1,3,5-cycloheptatriene, 1,3,5-cyclooctatriene, and the like.

As set forth above the metal complexes employed as catalysts the process of the invention are those derived from a d-group transition element, as hereinbefore defined, and a π-bonding ligand, as hereinbefore defined with the proviso that at least one of the π-bonding ligands employed in forming the complex is either carbon monoxide or hydrocarbyl isocyanide. Thus the metal complexes employed in the process of the invention are selected from the class consisting of (a) strickly binary metal complexes in which only one π-bonding ligand is present and which is selected from the class consisting of carbon monoxide and hydrocarbyl isocyanides and (b) the metal complexes in which at least one molecule of the π-bonding ligand in the aforesaid binary metal complexes has been replaced by a second π-bonding ligand. The metal complexes employed in the process of the invention also include those binary metal complexes, as hereinbefore defined, in which part of the π-bonding ligand has been replaced by an aromatic hydrocarbon ligand such as benzene, toluene, xylene, and the like, as described by Nichols et al., J. Chem. Soc. 551, 1959, for the preparation of chromium carbonyl aromatic hydrocarbon complexes.

The metal complexes employed as catalysts in the process of the invention are, for the most part, well-known in the art, and can be prepared by procedures well-known in the art; see, for example, Cotton et al., supra, Chapters 27 and 28. Examples of metal complexes which can be employed as catalysts in the process of the invention are:

Binary metal complexes such as iron pentacarbonyl, diiron ennacarbonyl, chromium hexacarbonyl, dimanganese decacarbonyl, nickel tetracarbonyl, molybdenum hexacarbonyl, tungsten hexacarbonyl, dirhenium decacarbonyl, dicobalt octacarbonyl, ruthenium pentacarbonyl, diruthenium nonacarbonyl, osmium pentacarbonyl, diosmium nonacarbonyl, dirhodium octacarbonyl, diiridium octacarbonyl, vanadium hexacarbonyl, nickel tetra-(phenyl isocyanide), iron penta(phenyl isocyanide), chromium hexa(phenyl isocyanide), manganese hexa (methyl isocyanide) and the like.

Ternary and higher metal complexes such as tris(triphenylphosphine)molybdenum tricarbonyl, tris(triphenylarsine)molybdenum tricarbonyl, tris(triphenylstibine) molybdenum tricarbonyl cycloheptatrienemolybdenum tricarbonyl, cycloheptatrieneiron tricarbonyl, cycloheptatrienetungsten tricarbonyl, norbornadieneiron tricarbonyl, benzenechromium tricarbonyl ethylisocyanide: iron tetracarbonyl [Fe(CO)$_4$·CNC$_2$H$_5$], methylisocyanide: iron tetracarbonyl [Fe(CO)$_4$CNCH$_3$], methyl isocyanide: ethyl isocyanide: iron tricarbonyl

phenyl isocyanide: iron tetracarbonyl

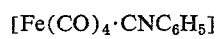

nickel tetra(phenyl isocyanide), and the like.

Any of the complexes of d-group transition elements and π-bonding ligands defined and exemplified above can be employed as catalysts in the process of the invention. A preferred group of catalysts falling within the above group are those complexes of the d-group transition elements wherein the sole π-bonding ligand is carbon monoxide. An especially preferred group of said catalysts are the carbonyls.

The process of the invention can be employed in the conversion of any organic isocyanate, including both mono- and polyisocyanates, to the corresponding carbodiimides. Where the process is applied to a monoisocyanate the resulting product will be be a monocarbodiimide and the reaction occurring is that illustrated by the following equation.

wherein R represents an organic radical such as an aromatic aliphatic, cycloaliphatic or araliphatic hydrocarbon residue, the only limitation on substitution in said radical being that it be free of substituents which are reactive with the isocyanate group. Thus, said organic radical should be free of substituents containing active hydrogen i.e. which display activity in the Zerewitinoff test. Berichte, 40, 2023, 1907. Examples of substituents which can be present in the molecule of the organic isocyanate are halo i.e. chlorine, bromine, fluorine, and iodine, cyano, nitro alkoxy such as methoxy, ethoxy, isopropoxy, octyloxy and the like, alkenyloxy such as allyloxy, butenyloxy, hexenyloxy, octenyloxy, and the like, alkylthio such as methylthio, ethylthio, isobutylthio, heptylthio, and the like, alkyl such as methyl, ethyl, isobutyl, hexyl, octyl, and the like, alkenyl such as allyl, butenyl, hexenyl, octenyl, and the like, alkoxycarbonyl such as methoxycarbonyl, ethoxycarbonyl, propoxycarbonyl, hexyloxycarbonyl, octyloxycarbonyl, and the like.

When the process of the invention is applied to a polyisocyanate the corresponding product is a linear or crosslinked polycarbodiimide depending upon the number and relative positions of the isocyanate groups in the starting polyisocyanate. For example, a symmetrically substituted diisocyanate when subjected to the process of the invention gives rise to the corresponding oligomeric polycarbodiimide which is terminated at each end by isocyanato.

Hence, the process of the invention can be applied to any organic mono- or poly-isocyanate subject to the limitation on substituents hereinbefore defined. Examples of the organic moieties, unsubstituted or substituted by "non-reactive" substituents as hereinbefore defined and exemplified, which can be present in the mono- and polyisocyanates employed in the process of the invention are mono and polyvalent aromatic residues such as aryl, for example, phenyl, tolyl, xylyl, naphthyl, biphenylyl, and the like; arylene, for example phenylene, tolylene, naphthylene, and the like; arenyl (trivalent aromatic hydrocarbyl) such as phenenyl, tolenyl

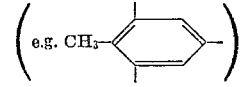

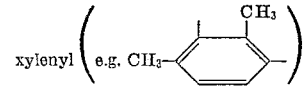

and the like: mono and polyvalent aliphatic residues such as alkyl, for example, methyl, ethyl, heptyl, decyl, undecyl, dodecyl, octadecyl and the like; alkylene such as methylene, ethylene, propylene, hexamethylene, octamethylene, dodecamethylene and the like; alkanetriyl such as 1,2,3-propanetriyl, 1,2,4-butanetriyl, 1,3,4-hexanetriyl, 1,3,8-octanetriyl, and the like; alkenyl for example allyl, butenyl, hexenyl, octenyl, dodecenyl, octadodecenyl, and the like; alkenylene, for example, propenylene, butenylene, octenylene, dodecenylene, and the like; alkenetriyl such as 1-propene-1,2,3-triyl, 1- butene-1,2,4-triyl, 2-hexene-1,3,4-triyl, 3-octene-1,3,8-triyl, and the like; cycloalkyl, for example, cyclopentyl, cyclohexyl, cyclooctyl and the like; cycloakylene, for example, 1,2-cyclopentylene, 1,3-cyclohexylene, 1,2 - cycloheptylene, 1,4 - cycloheptylene, 1,3-cyclooctylene, and the like: mono and polyvalent araliphatic residues such as aralkyl, for example, benzyl, phenethyl, 2-phenylpropyl, 2-naphthylmethyl, 1-naphthylmethyl, and the like; aralkylene such as 1,1-diphenyl-2,3-propylene, 1 - phenyl-1-(2-naphthyl) - 2,3-hexylene, 2-phenyl-3-xylyl-1,4-butylene, and the like.

Illustrative of the mono- and polyisocyanates which can be employed as starting materials in the process of the invention are:

Methyl, ethyl, isopropyl, butyl, hexyl, octyl, octadecyl, allyl, 2-pentenyl, cyclopentyl, cyclohexyl, 1-cyclopentenyl, 2-cycloheptenyl, benzyl, phenethyl, 3-phenylpropyl, benzhydryl, 2-naphthylmethyl, 2-naphthyl, phenyl, p-tolyl, m-tolyl, 2,6-diethylphenyl, 3-nitrophenyl, 4-methoxyphenyl, 2 - ethoxyphenyl, 3-hexyloxyphenyl, 4-allyloxyphenyl, 2-chlorophenyl, 4 - fluorophenyl, 2-chloro-3-methylphenyl, 3,4 - dichlorodiphenyl, 1,2,3,4-tetrahydro-2-naphthyl, 7-methyl - 1-naphthyl, 2-chloro-1-naphthyl, 2,4-dichloro-1-naphthyl, 5,8-dibromo-1-naphthyl, 2-nitro-1-naphthyl, 2,4-dinitro-1-naphthyl, 1-anthryl, and 2-phenanthryl isocyanates; 2,4-toluene diisocyanates, 2,6-toluenediisocyanate, 2,4,6 - toluene triisocyanate, 4,4' - diisocyanato diphenyl ether, 3,3' - dichloro-4,4'-diisocyanatodiphenyl ether, 4,4'-diisocyanatodiphenylmethane, 3,3' - dichloro - 4,4'-diisocyanato - diphenylmethane, 3,3'-dimethoxy-4,4'-diisocyanatodiphenylmethane, 4,4'-diphenylene diisocyanate, 2,4'-diphenylene diisocyanate, 2,3 - naphthalene diisocyanate, 1,5-naphthalene diisocyanate, hexemethylene diisocyanate, 1,4-diethylbenzene - $\beta,\beta'$ - diisocyanate, 4,4',4''-triisocyanato triphenylmethane, and the like.

In carrying out the process of the invention the desired organic isocyanate starting material is heated in the presence of a catalytic quantity of the aforesaid complex (I) of a d-group transition element and $\pi$-bonding ligand. Preferably, the isocyanate and catalyst (I) can be admixed prior to heating but, alternatively, the catalyst can be added to the isocyanate after the latter has been heated to the desired temperature. The temperature at which the reaction is carried out is advantageously of the order of about 100° C. to 250° C. and preferably within the range of about 150° C. to about 200° C. In many cases the catalyst (I), and/or in some cases the isocyanate, is gaseous at atmospheric pressure at temperatures within the above range and, in such cases, it is accordingly necessary to conduct the reaction in a closed vessel.

By "catalytic quantity" of the complex (I) is meant a quantity less than 1 mole per mole of isocyanate and advantageously a quantity within the range of 0.01 percent to about 5 percent by weight based on the amount of isocyanate. Preferably the amount of complex (I) employed in the process of the invention is of the order of about 1 percent by weight of isocyanate.

The reaction is allowed to proceed under the above stated conditions until conversion to carbodiimide is complete. The attainment of this point can be determined by methods which will be obvious to one skilled in the art; for example, by measurement of the amount of carbon dioxide eliminated or by observation of the disappearance of the infrared absorption band at $4.4\mu$ which is characteristic of the —NCO group. When this end point is reached the desired carbodiimide can be isolated from the reaction product by procedures conventional in the art. For example, when the carbodiimide is sufficiently volatile to be distilled, separation can be effected by fractional distillation. In the case of solid carbodiimides separation and isolation can be achieved by solvent extraction, fractional crystallization and the like techniques. Other alternative methods of achieving separation and isolation include chromatography, countercurrent distribution and the like. In general it is desirable to choose as catalyst for any particular isocyanate a compound (I) as hereinbefore defined which has a boiling point, or solvent solubility characteristics, sufficiently distingiushed from the corresponding property of the resultant carbodiimide as to facilitate the separation of the two components of the reaction mixture.

In the case of catalysts (I) which are sufficiently less volatile than the carbodiimide produced in the process of the invention to enable the latter to be removed from the reaction product by distillation, it has been found that the reaction product residue containing the used catalyst can be employed in the conversion of a further charge of isocyanate to the corresponding carbodiimide. Hence, in such cases it is possible to employ one charge of catalyst (I) to convert a multiplicity of charges of isocyanate to the corresponding carbodiimide. The use of such a procedure offers obvious advantages in terms of reduction of operating costs including raw materials and labour. The above semicontinuous process represents a particular aspect of the novel process of the invention.

In a further aspect of the process of the invention insofar as it applies to the conversion of polyisocyanates to polycarbodiimides, the degree of polymerization in said polycarbodiimide can be controlled, at least in part, by adding to the reaction mixture an active hydrogen containing monomer, preferably an alkanol such as methanol, ethanol, butanol, and the like. The latter reacts with the terminal isocyanate groups in the polymer chain thereby preventing further growth of said polymers. The procedural techniques employed and the active hydrogen containing monomers are advantageously those described in U.S. Patent 2,941,983.

As will be appreciated by one skilled in the art, the use of a mixture of two or more isocyanates in the process of the invention will give rise to the corresponding mixed carbodiimides, the exact composition of the resulting product depending upon the nature and proportion in which the isocyanates are present in the starting material.

The mono- and polycarbodiimides which are produced by the process of the invention are well-known in the art and their usefulness is well-recognized in the art. For example the mono- and polycarbodiimides can be used as stabilizers for polyesters and for polyurethanes derived therefrom in accordance with the procedures described in U.S. Patents 3,193,522, 3,193,523, 3,193,524 and 3,193,-525. Many of the monocarbodiimides produced in accordance with the invention are also useful as catalysts in the acylation of high molecular weight polyoxymethylenes as is described in U.S. Patent 3,170,896, and as condensation agents in the preparation of peptides as is described by Sheehan et al., J. Am. Chem. Soc. 77, 1067, 1955.

The polycarbodiimides prepared in accordance with the process of the invention are high molecular weight stable polymers which can be formed, by conventional procedures, into a variety of shaped articles including fibers, films, sheets and the like.

The process of the invention has the advantage over catalytic processes for the conversion of isocyanates to carbodiimides hitherto known in that it is of general applicability, employs catalysts which are readily available and which are reasonably priced, and is free from the production of by-products such as trimers frequently produced in previously known processes.

The following examples describe the manner and process of making and using the invention and set forth the best mode contemplated by the inventors of carrying out the invention but are not to be construed as limiting.

*Example 1*

A mixture of 26.6 g. (0.2 mole) of o-tolyl isocyanate and 0.26 g. (1% by weight of isocyanate) of iron pentacarbonyl was heated rapidly to reflux. The boiling point of the mixture was observed to have increased from 180° C. to 250° C. after 36 minutes of refluxing. At the end of this time the infrared spectrum of an aliquot indicated the absence of absorption at $4.4\mu$ (NCO band). The resulting product was distilled under reduced pressure to yield 18.75 g. (85% theoretical yield) of di-o-tolylcarbodiimide in the form of a liquid having a boiling point of 130 to 132° C. at 0.1 mm. of mercury.

*Example 2*

A mixture of 26.6 g. (0.2 mole) of o-tolyl isocyanate and 0.25 g. (1% by weight of isocyanate) of diiron ennacarbonyl was heated rapidly to reflux and maintained thereat until the boiling point of the reaction mixture reached 250° C. (elapsed time 43 minutes). The resulting product was distilled under reduced pressure to give 18.25 g. (82.3% theoretical yield) of di-o-tolylcarbodiimide having a boiling point of 130 to 132° C. at a pressure of 0.1 mm. of mercury.

Example 3

A mixture of 26.6 g. (0.2 mole) of o-tolyl isocyanate and 0.26 g. (1% by weight of isocyanate) of tungsten hexacarbonyl was heated rapidly to reflux and maintained thereat until the boiling point of the reaction mixture reached 250° C. (elapsed time 68 minutes). The resulting product was distilled under reduced pressure to give 19 g. (85.6% theoretical yield) of di-o-tolylcarbodiimide having a boiling point of 130 to 132° C. at a pressure of 0.1 mm. of mercury.

Example 4

A mixture of 26 g. (0.2 mole) of o-tolyl isocyanate and 0.26 g. (1% by weight) of molybdenum hexacarbonyl was heated rapidly to reflux and maintained thereat until the boiling point of the reaction mixture reached 250° C. (elapsed time 200 minutes). The resulting product was distilled under reduced pressure to give 18.15 g. (81.8% theoretical yield) of di-o-tolycarbodiimide having a boiling point of 130 to 132° C. at a pressure of 0.1 mm. of mercury.

Example 5

A mixture of 66.5 g. (0.5 mole) of o-tolyl isocyanate and 0.665 g. (1% by weight) of iron pentacarbonyl was heated at 180 to 184° C. for 3 hrs. At the end of this time the resulting product was distilled under reduced pressure to obtain 47.25 g. (85% theoretical yield) of di-o-tolylcarbodiimide having a boiling point of 130 to 135° C. at a pressure of 0.1 mm. of mercury. To the undistilled residue (5.3 g.) from the above reaction was added 66.5 g. (0.5 mole) of o-tolyl isocyanate and the resulting mixture was heated for 4 hrs. at 180 to 184° C. At the end of this time the resulting product was distilled under reduced pressure to obtain 46.8 g. (84.3% theoretical yield) of di-o-tolylcarbodiimide having a boiling point of 130 to 132° C. at a pressure of 0.1 mm. of mercury. The residue from the distillation was then used as catalyst in the conversion of a further charge of isocyanate to carbodiimide and this process was repeated a number of times without exhausting the catalytic activity of the undistilled residue.

Example 6

A mixture of 25 g. (0.2 mole) of cyclohexyl isocyanate and 0.5 g. (2% by weight of isocyanate) of iron pentacarbonyl was heated under reflux until the infrared spectrum of an aliquot showed no absorption of 4.4μ. The resulting product was distilled under reduced pressure to obtain 11.75 g. (57% theoretical yield) of dicyclohexylcarbodiimide having a boiling point of 107° C. at a pressure of 0.5 mm. of mercury.

Example 7

Using the procedure of Example 1, but replacing iron pentacarbonyl by chromium hexacarbonyl, dimanganese decacarbonyl, nickel tetracarbonyl, dirhenium decacarbonyl, dicobalt octacarbonyl, ruthenium pentacarbonyl, osmium pentacarbonyl, dirhodium octacarbonyl, diiridium octacarbonyl, or vanadium hexacarbonyl, and heating the reaction mixture until the infrared spectrum of an aliquot shows no absorption at 4.4μ, there is obtained di-o-tolylcarbodiimide in comparable yield.

Example 8

Using the procedure described in Example 1, but replacing o-tolyl isocyanate by 2,6-diethylphenyl isocyanate there is obtained di(2,6-diethylphenyl)carbodiimide.

Similarly, using the procedure described in Example 1, but replacing o-tolyl isocyanate by any of the following isocyanates:

hexyl isocyanate,
octadecyl isocyanate,
hexemethylene diisocyanate,
allyl isocyanate,
benzyl isocyanate,
phenethyl isocyanate,
1-cyclohexenyl isocyanate,
p-chlorophenyl isocyanate,
p-methoxyphenyl isocyanate,
benzhydryl isocyanate,
2-naphthyl isocyanate,
4,4'-diisocyanato diphenyl ether,
4-4'-diisocyanato diphenyl methane,
4,4'-diphenylene diisocyanate,
and 1,4-diethylbenzene-β,β'-diisocyanate, and continuing the heating in each case until the infrared spectrum of an aliquot shows no absorption at 4.4μ, there are obtained:

dihexyl carbodiimide,
diocetadecyl carbodiimide,
poly(hexamethylene) carbodiimide,
diallyl carbodiimide,
dibenzyl carbodiimide,
diphenethyl carbodiimide,
di(1-cyclohexenyl) carbodiimide,
di(p-chlorophenyl) carbodiimide,
di(p-methoxyphenyl) carbodiimide,
di(benzhydryl) carbodiimide,
di(2-naphthyl) carbodiimide
poly(4,4'-diphenylether) carbodiimide,
poly(4,4'-diphenylmethane) carbodiimide,
poly(4,4'-diphenylene) carbodiimide, and
poly(β,β'-1,4-diethylbenzene) carbodiimide,
respectively.

I claim:

1. A process for the conversion of an organic isocyanate to the corresponding carbodiimide, said organic isocyanate being selected from the class consisting of an organic monoisocyanate and an organic polyisocyanate wherein the organic moiety in each case is selected from aryl from 6 to 12 carbon atoms, inclusive, arylene from 6 to 12 carbon atoms, inclusive, arenyl from 6 to 12 carbon atoms, inclusive, alkyl from 1 to 18 carbon atoms, inclusive, alkylene from 1 to 12 carbon atoms, inclusive, alkanetriyl from 3 to 8 carbon atoms, inclusive, alkenyl from 3 to 18 carbon atoms, inclusive, alkenylene from 3 to 12 carbon atoms, inclusive, alkenetriyl from 3 to 8 carbon atoms, inclusive, cycloalkyl from 5 to 8 carbon atoms, inclusive, cycloalkylene from 5 to 8 carbon atoms, inclusive, aralkyl from 7 to 11 carbon atoms, inclusive, and aralkylene from 15 to 22 carbon atoms, inclusive, and wherein said organic moiety is substituted by a member selected from the class consisting of hydrogen, halo, cyano, nitro, alkoxy from 1 to 8 carbon atoms, inclusive, alkenyloxy from 3 to 8 carbon atoms, inclusive, alkylthio from 1 to 7 carbon atoms, inclusive, alkyl from 1 to 8 carbon atoms, inclusive, alkenyl from 3 to 8 carbon atoms, inclusive, and alkoxycarbonyl wherein alkoxy is from 1 to 8 carbon atoms, inclusive which process comprises heating said organic isocyanate at a temperature within the range of about 100° C. to about 250° C. in the presence of a metal complex derived from a d-group transition element and a π-bonding ligand selected from the class consisting of carbon monoxide, nitric oxide, hydrocarbyl isocyanide, trihydrocarbyl phosphine, trihydrocarbyl arsine, trihydrocarbyl stibine, and dihydrocarbyl sulfide, with the proviso that at least one of the π-bonding ligands in the above said metal complex is selected from the group consisting of carbon monoxide and hydrocarbyl isocyanide all the remaining ligands in said metal complex being members of the aforesaid class of ligands, wherein hydrocarbyl in each instance is selected from the group consisting of alkyl from 1 to 12 carbon atoms, inclusive, alkenyl from 2 to 12 carbon atoms, inclusive, aralkyl from 7 to 11 carbon atoms, inclusive, aryl from 6 to 12 carbon atoms, inclusive, cycloalkyl from 4 to 8 carbon atoms, inclusive, and cycloalkenyl from 5 to 8 carbon atoms, inclusive, and wherein said metal complex is present in the reaction mixture in an amount less than equimolar with respect to said organic isocyanate.

2. A process according to claim 1 wherein the metal complex is a d-group transition element carbonyl.

3. A process according to claim 1 wherein the metal complex is iron pentacarbonyl.

4. A process for the conversion of an isocyanate selected from the class consisting of aryl isocyanate and aryl isocyanate substituted by a member selected from the class consisting of halo, cyano, nitro, alkoxy from 1 to 8 carbon atoms, inclusive, alkenyloxy from 3 to 8 carbon atoms, inclusive, alkylthio from 1 to 7 carbon atoms, inclusive, alkyl from 1 to 8 carbon atoms, inclusive, alkenyl from 3 to 8 carbon atoms, inclusive, and alkoxycarbonyl wherein alkoxy is from 1 to 8 carbon atoms, inclusive, wherein aryl in both instances is from 6 to 12 carbon atoms, to the corresponding carbodiimide which comprises heating said isocyanate at a temperature within the range of about 100° C. to about 250° C. in the presence of a metal complex derived from a d-group transition element and a $\pi$-bonding ligand selected from the class consisting of carbon monoxide, nitric oxide, hydrocarbyl isocyanide, trihydrocarbyl phosphine, trihydrocarbyl arsine, trihydrocarbyl stibine, and dihydrocarbyl sulfide, with the proviso that at least one of $\pi$-bonding ligands in the above said metal complex is selected from the group consisting of carbon monoxide and hydrocarbyl isocyanide all the remaining ligands in said metal complex being members of the aforesaid class of ligands, wherein hydrocarbyl in each instance is selected from the group consisting of alkyl from 1 to 12 carbon atoms, inclusive, alkenyl from 2 to 12 carbon atoms, inclusive, aralkyl from 7 to 11 carbon atoms, inclusive, aryl from 6 to 12 carbon atoms, inclusive, cycloalkyl from 4 to 8 carbon atoms, inclusive, and cycloalkenyl from 5 to 8 carbon atoms, inclusive, and wherein said metal complex is present in the reaction mixture in an amount less than equimolar with respect to said organic isocyanate.

5. A process according to claim 4 wherein the metal complex is a d-group transition element carbonyl.

6. A process according to claim 4 wherein the metal complex is iron pentacarbonyl.

7. A process for the conversion of o-tolyl isocyanate to di(o-tolyl) carbodiimide which comprises heating o-tolyl isocyanate at a temperature within the range of about 100° C. to about 250° C. in the presence of a metal complex derived from a d-group transition element and carbon monoxide, said metal complex being present in the reaction mixture in an amount less than equimolar with respect to said isocyanate.

8. A process according to claim 7 wherein said metal complex is an iron carbonyl.

9. A process according to claim 7 wherein said metal complex is iron pentacarbonyl.

10. A process for the conversion of cyclohexyl isocyanate to dicyclohexyl carbodiimide which comprises heating cyclohexyl isocyanate at a temperature within the range of about 100° C. to about 250° C. in the presence of a metal complex derived from a d-group transition element and carbon monoxide, said metal complex being present in the reaction mixture in an amount less than equimolar with respect to said isocyanate.

11. A process according to claim 10 wherein said metal complex is an iron carbonyl.

12. A process according to claim 10 wherein said metal complex is iron pentacarbonyl.

References Cited
UNITED STATES PATENTS 3,157,662  11/1964  Smeltz _____ 260—551

HENRY R. JILES, *Primary Examiner.*

H. I. MOATZ, *Assistant Examiner.*